Oct. 14, 1941.  G. H. HUFFERD ET AL  2,259,067
COMPOSITE JOINT STUD AND METHOD OF MAKING SAME
Filed May 18, 1939
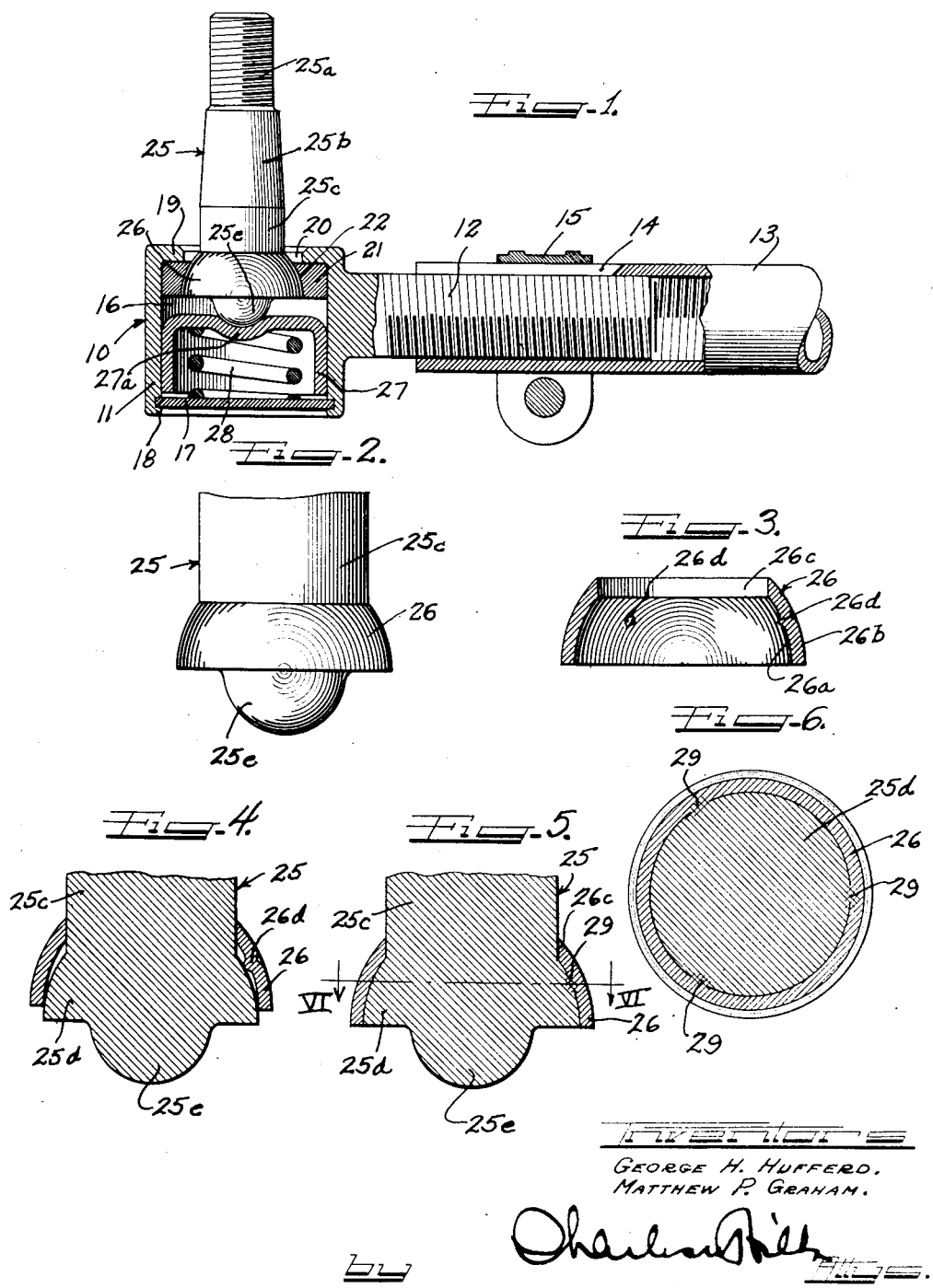
Inventors
GEORGE H. HUFFERD.
MATTHEW P. GRAHAM.

Patented Oct. 14, 1941

2,259,067

UNITED STATES PATENT OFFICE 2,259,067

COMPOSITE JOINT STUD AND METHOD OF MAKING SAME

George H. Hufferd and Matthew P. Graham, Detroit, Mich., assignors to Thompson Products Incorporated, Cleveland, Ohio, a corporation of Ohio Application May 18, 1939, Serial No. 274,327

7 Claims. (Cl. 29—152)

This invention relates to studs for tie rod joints and the like joints and more particularly relates to joint studs having tough, shock-resisting body portions and hardened bearing surfaces capable of resisting wear.

The invention includes a process for providing the tough stud body members with wear-resisting bearing surfaces.

While the invention will hereinafter be specifically described in connection with tie rod joints, it should be understood that the studs of this invention are adapted for wide usage in universal joints and bearings.

The stud of a tie rod joint is subjected to severe stresses as well as to great frictional wear. The desired stud should, therefore, have a tough, stress-resisting base or body portion and hardened, wear-resisting bearing surfaces. Since hardened metals are usually somewhat brittle, they do not resist mechanical shocks and stresses to an extent desired for safe use in tie rod joints where a broken stud may cause a serious automobile accident.

This invention now provides joint studs possessing both the desired toughness properties and the desired wear-resisting properties.

According to the invention a headed tough-steel stud body member is provided. A hardened metal bearing cap is disposed around the head of the headed body member and is welded to this head for providing a hard bearing surface thereon. The cap member can be case hardened or otherwise treated to provide wear-resisting qualities thereto.

It is, then, an object of the invention to provide a stud composed of a tough, stress-resisting body portion or base and a wear-resisting hardened bearing surface.

A further object of the invention is to provide an economical process of making composite studs capable of resisting severe mechanical stresses and frictional wear.

Another object of the invention is to provide a process of forming joint studs having hardened bearing surfaces composed of different metal than the body portion of the studs.

A specific object of the invention is to provide joint studs having hardened metal bearing caps welded over the heads of headed tough metal stud body members.

Other and further objects of the invention will become apparent to those skilled in the art from the following detailed description of the accompanying sheet of drawings which illustrate a preferred embodiment of the invention.

On the drawing:

Figure 1 is a cross-sectional view, with parts in elevation, of a tie rod joint equipped with a stud according to this invention.

Figure 2 is an enlarged fragmentary view of the joint stud used in the joint shown in Figure 1.

Figure 3 is a vertical cross-sectional view taken through a bearing cap used for forming the bearing surface of the stud shown in Figures 1 and 2.

Figure 4 is a fragmentary vertical cross-sectional view of a stud body member and a metal bearing cap illustrating the method in which the cap is disposed around the body member.

Figure 5 is a fragmentary vertical cross-sectional view of a joint stud according to this invention illustrating the hardened bearing cap welded thereon.

Figure 6 is a horizontal cross-sectional view taken along the line VI—VI of Figure 5.

As shown on the drawing:

In Figure 1 the reference numeral 10 designates generally a tie rod joint. The tie rod joint 10 is composed of a housing or casing 11 having an integral laterally extending threaded shank portion 12 seated in threaded relation in the end of a tie rod or other link member 13. As is customary, the tie rod 13 is slotted at the end thereof as at 14 and a clamp member 15 is disposed around the slotted end to tighten the rod around the shank so as to lock the same in threaded position.

The housing 11 defines a cylindrical chamber 16 having the bottom thereof closed by a closure plate 17 which is spun into the housing as at 18. The top of the housing has an inturned annular flange 19 defining a restricted opening 20 to the chamber 16.

A bearing ring 21 is pressed into the chamber 16 against the flange 19. This bearing ring 21 can have a tight press fit with the housing 11.

The bearing ring has a segmental spherical or toroidal inner bearing wall 22 converging toward the opening 20 of the housing. If desired, the bearing wall 22 could be formed integrally with the joint housing.

According to this invention a joint stud 25 composed of a body member having a cylindrical threaded top end 25a, the tapered intermediate portion 25b converging outwardly from the bottom of the threaded top 25a, a cylindrical neck portion 25c, a segmental spherical or toroidal head portion 25d (Figures 4 and 5) and a rounded button 25e projecting from the bottom of the head 25d, is provided with a metal bearing cap 26 disposed around the head 25d thereof. The bearing cap 26 is seated against the bearing wall 22 of the ring 21 and held in bearing relation thereon by a cap member 27 slidably mounted in the chamber 16. The cap member 27 has a depression 27a in the top wall thereof adapted to receive the button 25e of the stud. A coiled spring 28 is mounted in the cap member 27 and held under compression between the closure plate 17 and the top wall of the cap member so as to urge the cap member against the button end of the stud thereby maintaining the bearing cap 26 in a full seated position on the bearing wall 22 of the ring 21.

The neck portion 25c of the stud projects freely through the opening 20 of the housing 11 so that the bearing cap 26 can tilt and rotate on the bearing wall 22.

The stud body member 25 is preferably formed of a tough steel and machined or die-pressed to the shape illustrated in Figure 1. The head 25d of the stud body portion can be formed by an upsetting or a die-shaping operation and preferably has a segmental spherical contour. If desired, the button end 25e of the stud body can be case hardened. However, the head 25d is preferably tough so as to resist mechanical stresses and, being heat-treated for toughness, it does not have desired wear-resisting properties. The bearing cap 26 is thus provided for forming a hard bearing surface on the stud head.

As shown in Figure 3 of the drawing the bearing cap 26 can be coined from a flat disc or washer by a simple stamping operation. The cap 26 has inner and outer segmental spherical side walls 26a and 26b respectively. These side walls converge inwardly to define an annular shoulder or collar 26c adapted to snugly fit around the neck 25c of the stud body 25.

During the coining of the cap 26, a plurality of indentations are formed around the periphery thereof preferably near the collar portion 26c. These indentations provide projections 26d on the inner walls 26a.

As shown in Figure 4, a bearing cap 26 is slipped over the stud body 25 until the projections 26d thereof contact the head 25d. These projections will prevent full conformity between the bearing cap 26 and the head 25d.

An electric current is then passed through the stud body 25 and the bearing cap 26 while the bearing cap is being urged toward the bottom of the head portion 25d. The projections 26d of the bearing cap will melt down and flux with the head 25d to form spot welds 29 (Figures 5 and 6) integrally uniting the bearing cap with the head of the stud body. The melting down of the projections 26d permits the bearing cap to assume a fully seated position on the head 25d as shown in Figure 5. In its fully seated position the annular shoulder 26c of the bearing cap fits snugly around the neck 25c of the stud body and the bottom of the cap is in substantial alignment with the bottom of the head 25d.

The resulting composite joint stud thus has a tough, stress-resisting body portion and a hardened, wear-resisting bearing surface. This bearing surface is spot-welded to the body portion to form an integral part thereof.

It should be understood that other well known securing operations can be used in place of spot-welding to unite the bearing cap with the stud body. Thus, if desired, a projection weld could be made uniting the entire inner surface 26a of the bearing cap with the head 25d of the stud body.

It will, of course, be understood that various details of the process and product may be varied through a wide range without departing from the principles of this invention and it is, therefore, not the purpose to limit the patent granted hereon otherwise than necessitated by the scope of the appended claims.

We claim as our invention:

1. The method of making composite joint studs which comprises fabricating a stud body having a shank portion and a segmental spherical head portion converging into said shank portion, coining a flat sheet of metal into segmental spherical shape having an aperture therethrough, inserting the shank of the stud body through said aperture of the coined member and welding the coined member to the segmental spherical head of the stud body.

2. The process of making joint studs having hardened bearing surfaces which comprises telescoping a hardened metal bearing cap having inwardly extending projections around the head of a tough metal stud body with said projections contacting said head, passing an electric current between the metal cap and the stud body to melt down said projections while urging said cap into fully seated position on said head and thereby spot-welding the cap to the head.

3. The method of making composite joint studs having wear-resisting bearing surfaces and stress-resisting body portions which comprises fabricating a tough metal stud body to provide an enlarged head portion and a shank portion extending therefrom, coining wear resisting sheet metal to form an apertured bearing cap fitting said head, inserting said shank portion through the aperture of said cap to seat the cap on the head, and welding said bearing cap to said head.

4. A joint stud for tie rod joints and the like universal joints which comprises a tough stress resisting metal stud body member having a threaded cylindrical end, a tapered intermediate portion, a neck portion, and an enlarged head portion converging into said neck portion, and a hollow hard bearing metal cap conforming in shape with said head portion welded thereto in integral relation therearound.

5. The process of making joint studs having hardened bearing surfaces which comprises telescoping a hardened metal bearing cap having inwardly extending projections around the head of a stud body with said projections contacting said head, pressing the cap tightly against the head and simultaneously melting the projections to weld the cap to the head.

6. A composite joint stud which comprises a tough stress resisting metal stud body having a shank portion and an integral segmental spherical head portion converging into the shank portion, a coined hollow segmental spherical hardened metal bearing cap of uniform thickness disposed around said shank portion and covering said head portion, and a welded bond permanently uniting said cap to said head portion.

7. The process of making composite joint studs which comprises fabricating inwardly extending projections on the inner surface of a hollow apertured metal cap, inserting the shank of a headed stud through the aperture of said cap to seat the projections on the head of the stud, pressing the cap against the head and melting the projections to weld the cap to the head.

GEORGE H. HUFFERD.
MATTHEW P. GRAHAM.